United States Patent [19]

Yamamori et al.

[11] 4,255,983
[45] Mar. 17, 1981

[54] AUTOMATIC TRANSMISSION WITH GOVERNOR DRIVING ARRANGEMENT

[75] Inventors: Takahiro Yamamori, Tokyo; Kazuyoshi Iwanaga; Kunio Ohtsuka, both of Yokohama, all of Japan

[73] Assignee: Nissan Motor Company, Limited, Yokohama, Japan

[21] Appl. No.: 958,766

[22] Filed: Nov. 8, 1978

[30] Foreign Application Priority Data

Sep. 18, 1978 [JP] Japan ............................ 53-114944

[51] Int. Cl.³ .................................... F16H 3/74
[52] U.S. Cl. ......................................... 74/752 C
[58] Field of Search ............... 74/695, 752 R, 752 A, 74/752 B, 752 C, 752 D, 752 E, 752 F

[56] References Cited

U.S. PATENT DOCUMENTS 2,007,442  7/1935  Dodge ........................ 74/752 F

FOREIGN PATENT DOCUMENTS 285236  2/1928  United Kingdom .
923825  4/1963  United Kingdom .
1206882  9/1970  United Kingdom .

Primary Examiner—Lawrence J. Staab
Attorney, Agent, or Firm—Thompson, Birch, Gauthier & Samuels

[57] ABSTRACT

A set of planetary pinions forming part of a planetary gear system are meshed with a ring gear which is secured to a power output shaft operatively connected to a final drive unit. The ring gear is formed at its outer peripheral surface with teeth of worm which mesh with a worm wheel connected to a governor valve body for producing a governor pressure in accordance with the rotational speed of the power output shaft.

7 Claims, 8 Drawing Figures

AUTOMATIC TRANSMISSION WITH GOVERNOR DRIVING ARRANGEMENT

This invention relates, in general, to an improvement of an automatic transmission for an automotive vehicle, and more particularly to an improvement in an arrangement for driving a governor valve body of the automatic transmission for a transverse engine of the vehicle equipped with a front-drive system.

It is a main object of the present invention to provide an improved automatic transmission for an automotive vehicle, which is sufficiently compact and accordingly suitable for being mounted on the body of the automotive vehicle.

It is another object of the present invention to provide an improved automatic transmission for a transverse engine of an automotive vehicle, whose inner construction is compact as compared with that of prior art automatic transmissions, achieving considerable reduction of overall size of the transmission.

It is a still another object of the present invention to provide an improved automatic transmission for a transverse engine of an automotive vehicle equipped with a front-drive system, which transmission includes a compact arrangement for driving a governor valve body which produces a governor pressure which increases with vehicle speeds.

It is a further object of the present invention to provide an improved automatic transmission for a transverse engine of an automotive vehicle equipped with a front-drive system, which transmission has a ring gear which meshes with a set of planetary pinions of a planetary gear system, the ring gear being formed with worm teeth which mesh with a worm wheel operatively connected to a governor valve body which produces a governor pressure.

It is a still further object of the present invention to provide an improved automatic transmission for an automotive vehicle, which transmission has a connecting member for connecting a power output shaft of the transmission to a ring gear which meshes with a set of planetary pinions, the connecting member being simple in construction and accordingly easy to produce.

Other objects, features and advantages of the automatic transmission according to the present invention will become more apparent from the following description taken in conjunction with the accompanying drawings in which like reference numerals are assigned to like parts and elements throughout the drawing, in which.

Figure 4A:
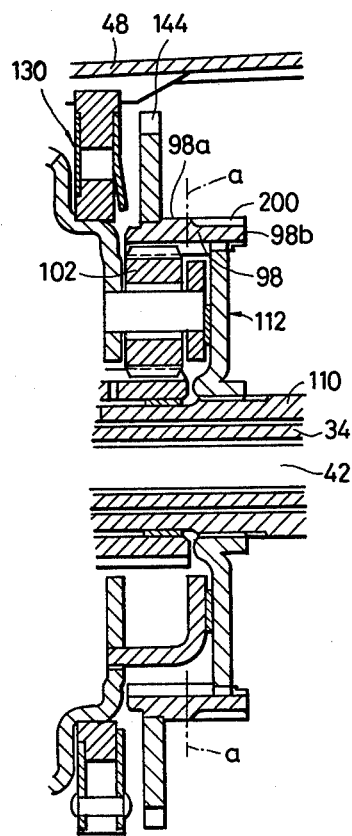
Figure 4B:
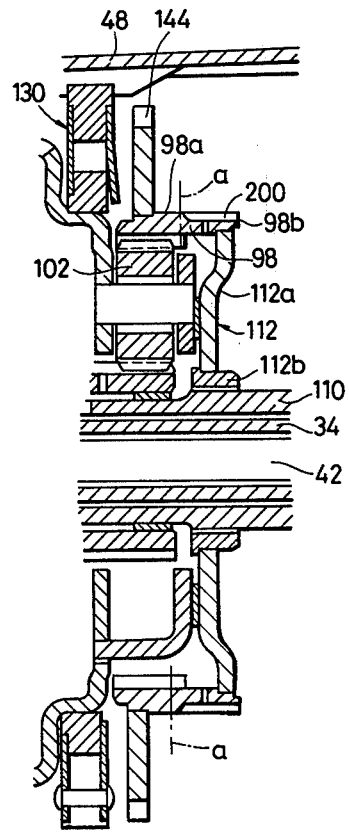
Figure 3A:
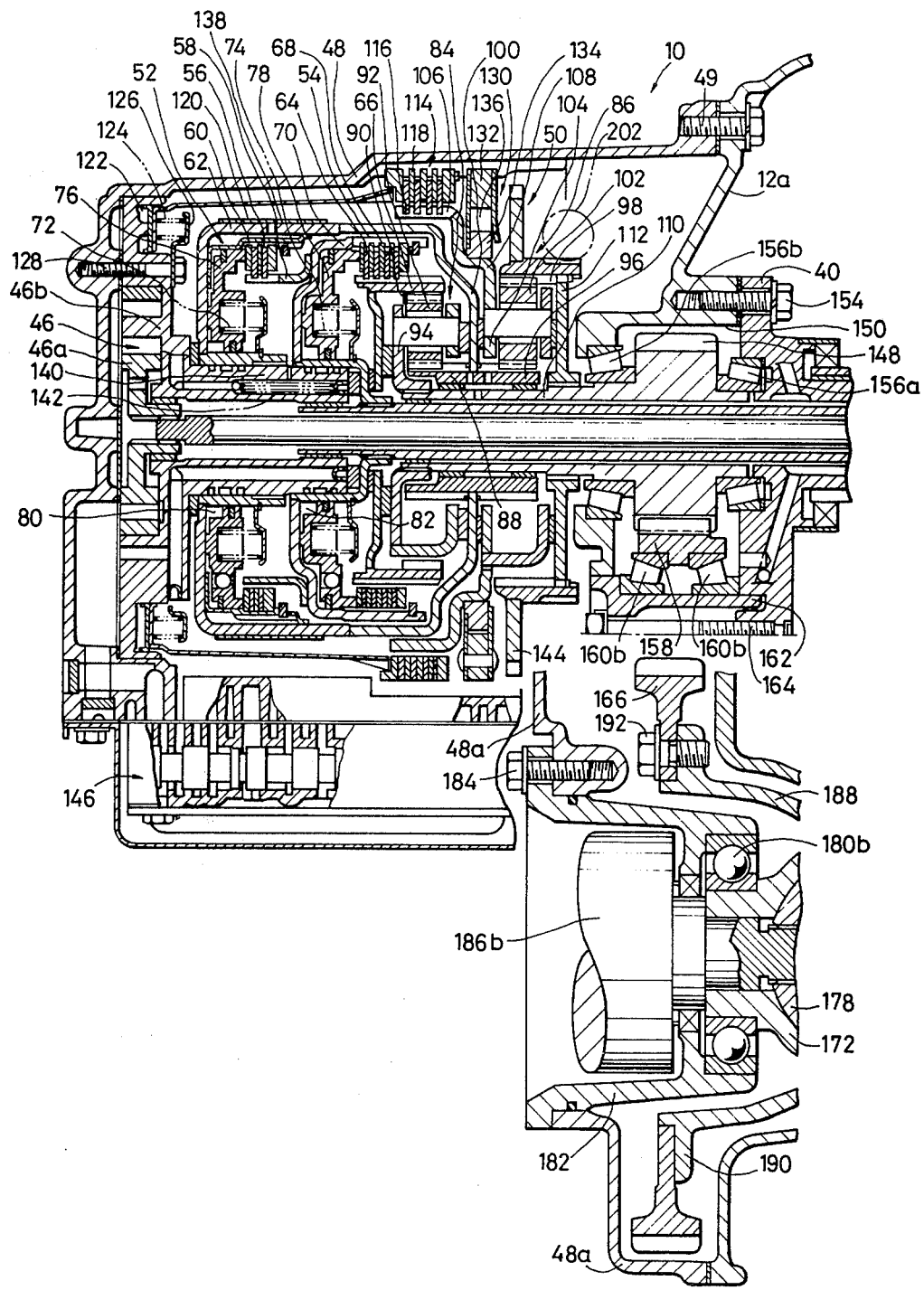
Figure 3B:
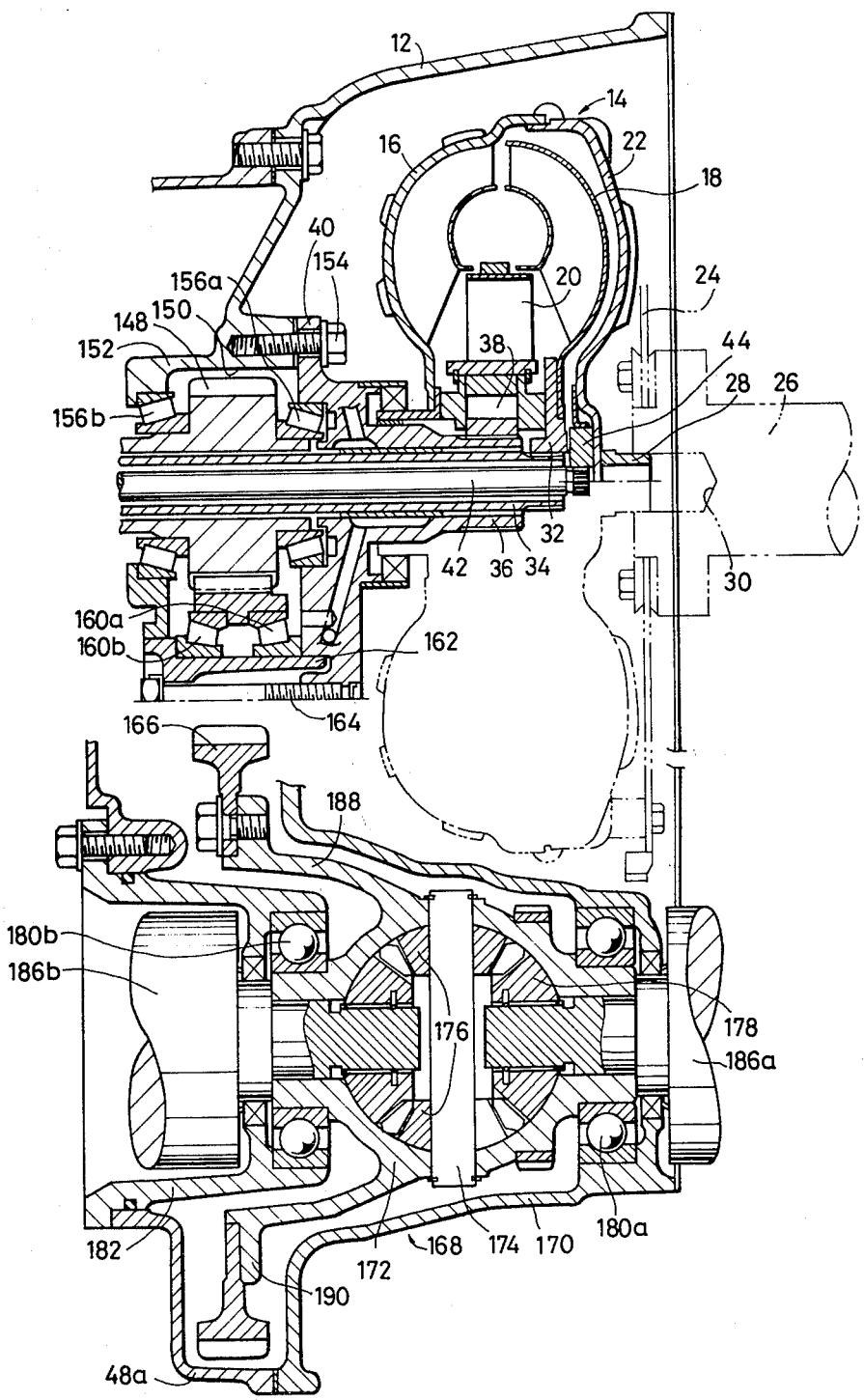
Figure 5:
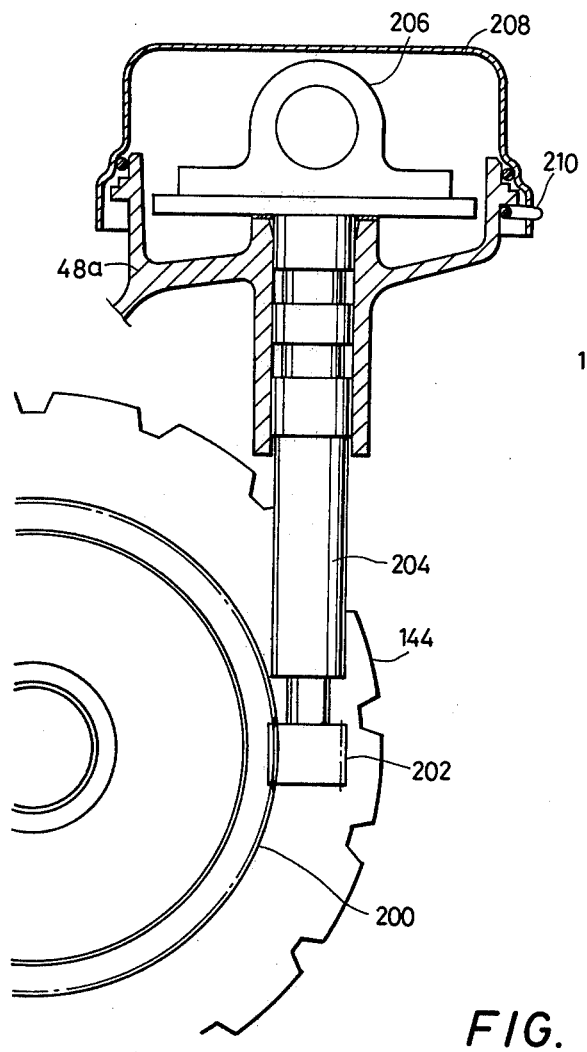
Figure 6:
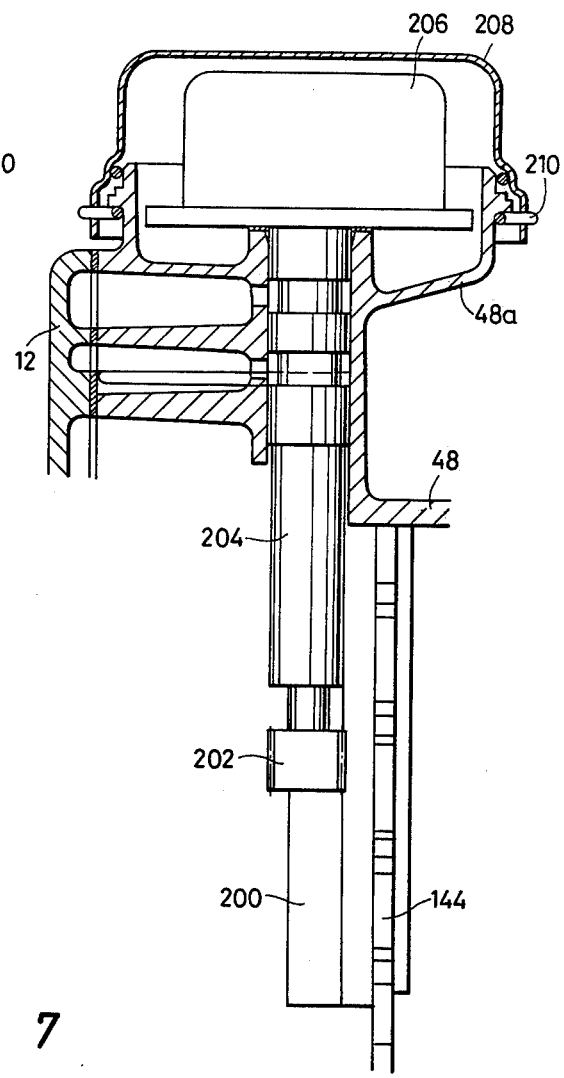
Figure 7:
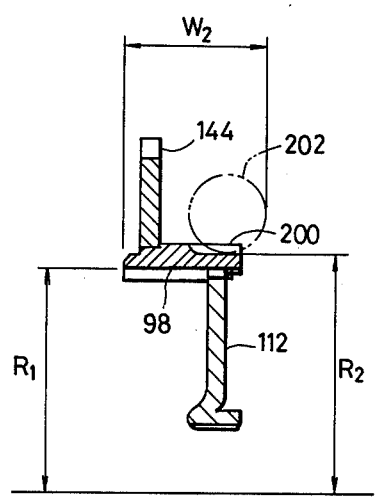

FIGS. 3A and 3B (hereinafter collectively referred to as "FIG. 3") are cross-sectional views of a preferred embodiment of an automatic transmission in accordance with the present invention, for an automotive vehicle;

FIG. 4A is an enlarged cross-sectional view showing an example of an arrangement for driving a governor valve body, of the transmission of FIG. 3;

FIG. 4B is an enlarged cross-sectional view similar to FIG. 4A, but shows another example of the arrangement for driving the governor valve body;

FIGS. 5 and 6 are enlarged illustrations showing the relationship between a ring gear for a set of planetary pinions and the governor valve body, of the transmission of FIG. 3; and FIG. 7 is an enlarged cross-sectional view showing the detailed design of the governor valve body driving arrangement of FIG. 4.

It is becoming increasingly important to achieve compactness in the design of automatic transmissions, particularly in vehicles employing frong wheel drive with a transverse engine whose longitudinal axis is transverse to the longitudinal axis of the vehicle. This is because, such a transverse engine must be mounted within a limited or smaller transverse width of the engine compartment located at the front of a vehicle body.

In such vehicles, the automatic transmission is, in general, located coaxially with the engine. Furthermore, the transmission is arranged so that a power output shaft of a planetary gear system extends toward a torque converter and accordingly a power output gear is interposed between the planetary gear elements of the gear system and the torque converter, in order to locate a final drive unit having a differential at the central portion of the transverse width of the vehicle so as to render generally equal the lengths of a pair of axle shafts which are connected to two front wheels, respectively.

Figure 1:
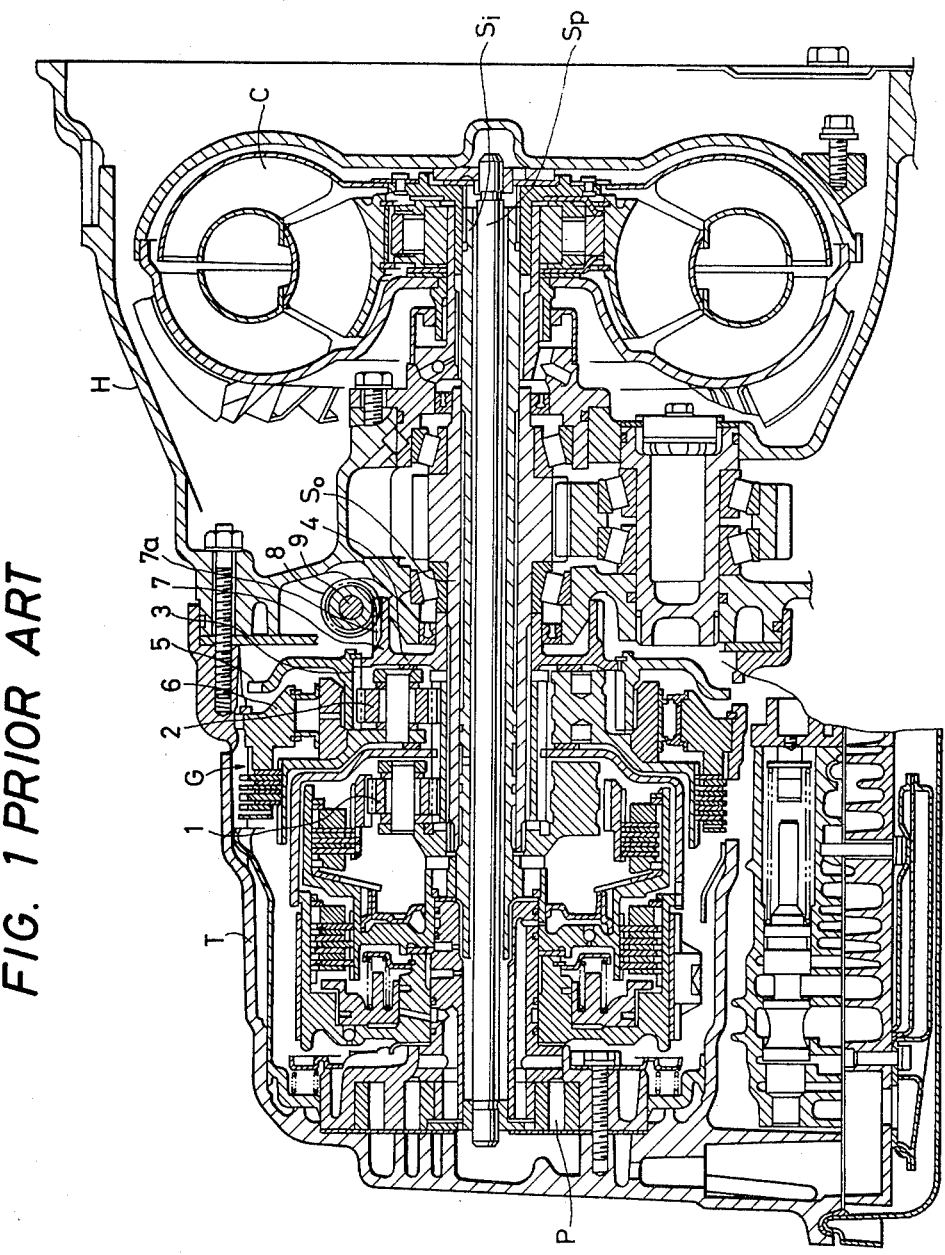
FIG. 1 is a cross-sectional view of a prior art automatic transmission for a motor vehicle.

An example of a conventional automatic transmission of the above-described type is illustrated in FIG. 1, in which the reference character H denotes a converter housing which is secured to an engine block (not numbered) and houses therein a torque converter C which is driven by an engine crankshaft (not shown). The torque converter C is operatively connected through an input shaft $S_i$ to a planetary gear system G which is, in turn, operatively connected through an output shaft $S_o$ to a final drive unit (not shown). The planetary gear system G is located in a transmission case T. An oil pump P is drivably connected to the torque converter C through a pump drive shaft $S_p$ which is disposed inside of the input shaft $S_i$.

The planetary gear system G is composed of first and second sets of planetary pinions 1 and 2. The second set of planetary pinions meshes with a ring gear 3 which is integrally formed with a parking gear 5 located adjacent and spacedly from a one-way clutch 6. A connecting member 4 connecting the ring gear 3 and shaft $S_o$ is formed with a cylindrical projection 7 with worm wheel teeth 7a. The worm wheel teeth 7a mesh with a worm 8 which is connected through a governor shaft 9 to a governor valve body (not shown) for producing a governor pressure which increases with the rotational speed of the output shaft $S_o$.

Figure 2:
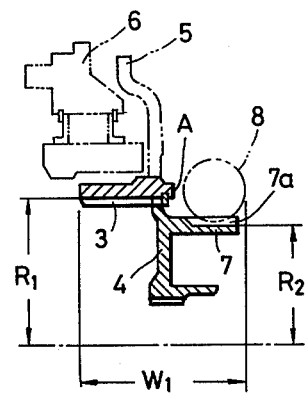
FIG. 2 is an enlarged cross-sectional view of an arrangement for driving a governor valve body, of the transmission of FIG. 1.

The thus arranged automatic transmission has encountered the following disadvantages: as clearly shown in FIG. 2, the radius $R_1$ of the root circle of the ring gear is larger than that $R_2$ of the worm wheel teeth 7a, accordingly the teeth 7a are formed at the cylindrical projection 7 which is projected to the opposite side of the ring gear 3 relative to the connecting member 4. With this arrangement, it is difficult to position the worm 8 closer to the ring gear 3 because of the obstruction provided by the end portion A. Therefore, in this instance, the dimension $W_1$ unavoidably becomes considerably large so that further minimizing this dimension $W_1$ is difficult in this regard. Additionally, the shape of the connecting member 4 is considerably complex and therefore difficult to produce.

An object of, the present invention is to overcome the disadvantages of the aforementioned prior art automatic transmission, by forming the teeth of worm at the outer peripheral surface of a ring gear meshed with a set of planetary pinions of a planetary gear system.

Referring now to FIG. 3 of the drawings, there is illustrated a preferred embodiment of an automatic transmission 10 in accordance with the present invention, for a transverse engine (not shown) of an automotive vehicle equipped with a front-drive system.

The transmission 10 comprises a converter housing 12 within which the torque converter assembly 14 is housed. The torque converter assembly 14 comprises a pump impeller 16, a turbine runner 18, and a stator 20 as is well known in the art. The pump impeller 16 is connected via a converter cover 22 and a drive plate 24 to a crankshaft 26 of a power plant such as an internal combustion engine (not shown) and is rotatable with crankshaft 26 about an axis which is aligned with the axis of rotation of the crankshaft 106. Denoted by 28 is a pilot element which is secured to a central portion of the converter cover 22 and is received in a central bore 30 of the crankshaft 26, as shown. The turbine runner 18 is mounted on a hub 32 which in turn is keyed or splined to a transmission hollow input shaft 34 which has a center axis aligned with the axis of rotation of the engine crankshaft 26. The stator 20 is positioned between the pump impeller 16 and the turbine runner 18 and is mounted on a stator support hollow shaft 36 through a torque converter one-way clutch assembly 38. The stator support hollow shaft 36 has the transmission hollow input shaft 34 axially passed therethrough in substantially coaxial relationship and is fixedly but detachably connected through a flange portion 40 thereof to a base wall 12a of the converter housing 12, as will be well understood hereinlater. The stator 20 is permitted to rotate about the center axis of the input shaft 34 in the same direction as the direction of the pump impeller 16 and accordingly as the direction of rotation of the engine crankshaft 26. An oil pump driving shaft 42 is rotatably and concentrically received in the input shaft 34 and has a right end to which a hub 44 of the converter cover 22 is splined or keyed. As will be understood hereinlater, a left end of the oil pump driving shaft 42 is keyed with a drive gear 46a of a transmission oil pump assembly 46 which has an oil pump body 46b bolted or otherwise secured to a stationary wall structure of a later-mentioned gear unit housing 48 of the transmission 10.

When the engine is in operation, the driving power produced by the engine is delivered from the engine crankshaft 26 to the pump impeller 16 through the converter cover 22 and is transmitted from the pump impeller 16 to the input shaft 34 through the turbine runner 18 with a torque multiplied by means of the stator 20 at a ratio which is variable with the ratio between the revolution speed of the engine crankshaft 26 and that of the input shaft 34. The pump impeller 16 thus drives not only the turbine runner 18 but also the transmission oil pump assembly 46 through the oil pump driving shaft 42 so that the oil pump assembly 46 delivers oil under pressure which is also variable with the revolution speed of the crankshaft 26 of the engine.

Within the gear unit casing 48 connected via bolts 49 to the converter housing 12 is positioned a gear unit 50 of the transmission 10. The unit 50 herein shown is arranged between the torque converter assembly 14 and the oil pump assembly 46. The gear unit 50 comprises first and second or high-and-reverse and forward drive clutches 52 and 54 which are positioned in a manner that the high-and-reverse clutch 52 is located between the oil pump assembly 46 and the forward drive clutch 54. The high-and-reverse clutch 52 comprises a plurality of plates 56 keyed or splined at their inner peripheral edges to a clutch hub 58 and plates 60 keyed or splined at their outer peripheral edges to a first clutch drum assembly 62. Likewise, the forward drive clutch 54 comprises a plurality of plates 64 keyed or splined at their inner peripheral edges to a clutch hub 66 and plates 68 keyed or splined at their outer peripheral edges to a second clutch drum 70. The clutch hub 58 for the high-and-reverse clutch 52 and the second clutch drum 70 for the forward drive clutch 54 are secured to each other and rotatable with the input shaft 34 with the second clutch drum 70 keyed or splined at its inner peripheral portion to a left end portion of the input shaft 34. The plate 56 of the high-and-reverse clutch 52 and the plates 68 of the forward drive clutch 54 thus serve as driving friction elements and, accordingly, the plates 60 of the high-and-reverse clutch 52 and the plates 64 of the forward drive clutch 54 serve as driven friction elements in the clutches 52 and 54, respectively. Clutch pistons 76 and 78 are respectively incorporated with the high-and-reverse clutch 52 and the forward drive clutch 54 respectively for bringing the clutches 52 and 54 into engagement when moved by a fluid fed into respective fluid chambers 80 and 82 which are formed between the clutch piston 76 and the first clutch drum assembly 62 and between the clutch piston 78 and the second clutch drum 70, respectively, as shown. Return springs 72 and 74 are respectively incorporated with the high-and-reverse clutch 52 and the forward drive clutch 54 to urge the pistons 76 and 78 in a direction to disengage the clutches 52 and 54, respectively.

The gear unit 50 further comprises first and second planetary gear assemblies 84 and 86 which are arranged at the right of the forward drive clutch 54 in the drawing. The first planetary gear assembly 84 comprises an externally toothed sun gear 88 and an internally toothed ring gear 90 which have a common axis of rotation aligned with the center axis of the input shaft 34. The ring gear 90 is formed on the clutch hub 66 for the forward drive clutch 54. The first planetary gear assembly 84 further comprises at least two planet pinions 92 each of which is in mesh with the sun and ring gears 88 and 90 and is rotatable about an axis around the common axis of rotation of the sun and ring gears 88 and 90. The planet pinions 92 of the first planetary gear assembly 84 are journaled on shafts of a pinion carrier 94. The second planetary gear assembly 86 is constructed similarly to the first planetary gear assembly 84 and thus comprises an externally toothed sun gear 96 and an internally toothed ring gear 98 which have a common axis of rotation aligned with the center axis of the transmission hollow input shaft 34. The sun gear 96 is integral with the sun gear 88 of the first planetary gear assembly 84. The united sun gears 88 and 96 of the first and second planetary gear assemblies 84 and 86, respectively, are jointly splined to a connecting shell 100 which encloses the forward drive clutch 54 and the first planetary gear assembly 84 is securely connected to the first clutch drum assembly 62 for the high-and-reverse clutch 52. The second planetary gear assembly 86 further comprises at least two planet pinions 102 each of which is in mesh with the sun and ring gears 96 and 98 and is rotatable about an axis around the common axis of rotation of the sun and ring gears 96 and 98. The planet pinions 102 of the second planetary gear assembly 86 are rotatably supported by a pinion carrier 104 having a drum portion 106 which leftwardly extends to enclose in part the connecting shell 100 therein, as shown. By the reason which will become clear from the latter, the drum portion 106 of the pinion carrier 104 has a circular step portion 108. The respective sun gears 88 and 96 of the first and second planetary gear assemblies 84 and 86 are formed with center bores through which a transmission hollow output shaft 110 having a center axis aligned with the center axis of the input shaft 34 is passed and axially extends toward the torque converter assembly 14. The output shaft 110 thus coaxially receives therein the input shaft 34, as shown. The output shaft 110 has a left end to which the pinion carrier 94 for the first planetary gear assembly 84 is splined at its inner peripheral edge and has an intermediate portion to which the ring gear 98 for the second planetary gear assembly 86 is connected through a generally disc shaped connecting member 112 which is keyed or splined at its inner peripheral edge to the intermediate portion of the output shaft 110 and at its outer peripheral edge to the ring gear 98. Concentrically mounted around the drum portion 106 of the pinion carrier 104 for the second planetary gear assembly 86 is a low-and-reverse brake 114. This brake 114 comprises a plurality of plates 116 keyed or splined at their inner peripheral edges to the drum portion 106 of the second planetary gear assembly 86, and a plurality of plates 118 which are keyed or splined at their outer peripheral edges to an intermediate portion of the inner wall of the gear unit housing 48. The low-and-reverse brake 114 further has a drum shaped piston 120 which is concentrically mounted around the first clutch drum assembly 62 for the high-and-reverse clutch 52 and engages at its right end to the leftmost member of the plates 116 and 118. The left end portion of the piston 120 is sealingly disposed in a fluid chamber 122 into which a fluid under pressure is fed to move the piston 120 rightwardly urging the plates 116 and 118 of the brake unit 114 to be engaged with one another against a biasing force developed by return springs 124 which are interposed between the left end portion of the piston 120 and a spring retainer 126 fixed to the oil pump body 46b via bolts 128. As shown, the fluid chamber 122 is formed in the oil pump body 46b. The low-and-reverse brake 114 is paralleled in effect by a transmission one-way clutch 130 which is positioned around the before-mentioned drum portion 106 for the second planetary gear assembly 86 and comprises a stationary outer race member 132, a rotatable inner race member 134 and a series of spring loaded rollers 136 disposed between the outer and inner race members 132 and 134. The stationary outer race member 132 is splined to the inner wall of the gear unit housing 48. On the other hand, the rotatable inner race member 134 is securely disposed on the before-mentioned circular step portion 108 of the drum portion 106 for the second planetary gear assembly 86. The rollers 136 are arranged in a manner to be caused to stick to the outer and inner race members 132 and 134 and thereby lock up the rotatable inner race member 134 to the stationary outer race member 132 when the inner race member 134 is urged to turn about the center axis of the output shaft 110 in a direction opposite to the direction of rotation of the engine crankshaft 26, viz., to the direction of rotation of the output shaft 110 to produce a forward drive mode of an automotive vehicle. The gear unit 50 of the transmission 10 further comprises a brake band 138 which wrappes the cylindrical outer surface of the first clutch drum assembly 62 for the high-and-reverse clutch 52. Although not shown, the brake band 138 is anchored at one end to the gear unit housing 48 and is at the other end connected to or engaged by a fluid operated band servo unit (not shown). Although, not shown in the drawing, a transmission governor assembly indirectly driven by the output shaft 110 is arranged in the gear unit housing 48 in the vicinity of the ring gear 98 of the second planetary gear assembly 86. The body 46b of the before mentioned oil pump assembly 46 has a rightwardly extending sleeve portion 140 in which a fluid passage 142 for lubrication fluid for the clutch assemblies 52 and 54 is formed. Indicated by numeral 144 is a parking gear which is secured on the ring gear 98 for the second planetary gear assembly 86, forming part of a parking lock assembly to lock the output shaft 110 by the aid of a parking pawl (not shown) meshing with the parking gear 144 during parking of the vehicle. Indicated generally by numeral 146 is a hydraulic control valve unit by which the gear unit 50 is controlled.

The output shaft 110 is integrally formed at its right section with an output gear 148 which has an axis of rotation aligned with the center axis of the output shaft 110. As will be understood from the drawing, the output gear 148 is situated within a chamber 150 which is defined by not only an extension 152 of the base wall 12a of the cover housing 12 but also the flange portion 40 of the stator support hollow shaft 36. The flange portion 40 is detachably connected to the base wall 12a by means of bolts 154. As shown, the extension 152 protrudes into the interior of the gear unit housing 48 and has at its leading end portion a bearing opening (no numeral) within which is situated a tapered roller bearing 156b. The flange portion 40 of the stator support hollow shaft 36 is formed at a portion exposed to the chamber 150 of the output gear 148 with a blind bore or bearing opening (no numeral) within which is situated another tapered roller bearing 156a. Inner races of these bearings 156a and 156b are mounted on the transmission output shaft 110 in a manner to put the output gear 148 therebetween. Meshing with the output gear 148 is an idler gear 158 which is supported by a pair of tapered roller bearings 160a and 160b. Inner races of these bearings 160a and 160b are coaxially mounted on a sleeve shaft 162 which is connected to the flange portion 40 of the before-mentioned stator support hollow shaft 36 by means of a bolt 164 passing through the sleeve shaft 162 in a manner that the axis of the idler gear 158 is parallel with the axis of the output gear 148. The idler gear 158 is meshed with an externally toothed ring gear 166 forming part of the final drive unit 168.

The final drive unit 168 is positioned on a lateral side of the transmission 10 and comprises a housing 170 integral with the converter housing 12 and housing therein a differential case 172, a differential pinion shaft 174 passing through the case 172, differential pinions 176 rotatably disposed about the pinion shaft 174, and differential side gears 178 each meshing with both the differential pinions 176 as is known in the art. The case 172 has both lateral end portions on which differential side bearings 180a and 180b are mounted. The right hand bearing 180a is securely received in the bore of the housing 170, while the left-hand bearing 180b is received in a drum-shaped retainer 182 which is detachably held in an opening (no numeral) formed in a laterally projected portion 48a of the gear unit housing 48. Denoted by numeral 184 is a bolt for connecting the retainer 182 to the portion 48a of the gear unit housing 48. Extending away from the differential side gears 178 are respective axle shafts 186a and 186b. The case 172 is integrally formed with a connecting shell portion 188 which extends leftwardly in this drawing and spacedly encloses in part the drum-shaped retainer 182. The connecting shell portion 188 has at the leading end thereof a flange 190 to which the above-mentioned externally toothed ring gear 166 is fixed by means of bolts 192.

With this, the power train between the internal combustion engine and the driving road wheels connected to the axle shaft 186a and 186b is made up.

The transmission 10 incorporating with the final drive unit 168 operates as follows:

TABLE 1

| Range | Clutches High-and-Reverse (52) | Forward drive (54) | Low & reverse brake (114) | One way clutch (130) | Brake band (138) Applied | Brake band (138) Released |
|---|---|---|---|---|---|---|
| "P" |  |  | o |  |  |  |
| "R" | o |  | o |  |  |  |
| "N" |  |  |  |  |  |  |
| Drive |  |  |  |  |  |  |
| "D₁" |  | o |  | o |  |  |
| "D₂" |  | o |  |  | o |  |
| "D₃" | o | o |  | (o) |  | o |
| "2" |  | o |  |  | o |  |
| 2 |  | o |  |  | o |  |
| "1" |  | o | o |  |  |  |

The high-and-reverse and forward drive clutches 52 and 54, low-and-reverse brake 114, one-way clutch 130 and brake band 138 of the transmission mechanism or the gear unit 50 having the construction hereinbefore described are operated in accordance with shedules indicated in Table 1.

In Table 1, the sign "O" indicates that for each of the high-and-reverse, forward-drive and one-way clutches 52, 54 and 130 the clutch in question is in a coupled condition and for the low-and-reverse brake 114 the brake is in a condition applied. As to the brake band 138, the sign "O" in the column under "Applied" indicates that the brake band 138 is actuated to lock up the first clutch drum assembly 62 and the sign "O" in the column under "Released" indicates that the brake band 138 is released from the first clutch drum assembly 62. The sign "O" enclosed in the parentheses means that there is a fluid pressure developed in the brake-apply chamber of the servo unit (not shown) but the brake band 138 is released from the first clutch drum assembly 62 with a fluid pressure also developed in the brake-release chamber of the servo unit.

The parking, reverse drive and neutral gear ranges and the automatic forward drive and manual second and first forward drive ranges as indicated in the leftmost column of Table are selectively established in transmission mechanism by manipulating a manual selector lever (not shown) which has positioned "P", "R", "N", "D", "2" and "1" respectively corresponding to the above-mentioned gear ranges.

When now the selector lever is in the parking range "P" or the neutral range "N", both of the high-and-reverse and forward drive clutches 52 and 54 are held in the uncoupled condition thereof so that the driving connection between the input and output shafts 34 and 110 is interrupted and as a consequence the output shaft 110 is maintained at rest even though the engine is in operation delivering its power output from the crankshaft 26. Under these conditions, either the parking range or the neutral range is established in the transmission mechanism depending upon whether the selector lever is held in the parking range "P" or in the neutral range "N". If the selector lever is in the parking range "P", the low-and-reverse brake 114 is held in the condition applied so that the drum portion 106 and accordingly the pinion carrier 104 of the second planetary gear assembly 86 are locked to the gear unit housing 48. During parking of the vehicle, the parking gear 144 mounted on the ring gear 98 for the second planetary gear assembly 86 is captured by the parking pawl (not shown) of the before-mentioned parking lock assembly so that the output shaft 110 is locked up to the gear unit housing 48.

When the manual selector lever is moved into the automatic forward drive range "D" with the engine operating, the forward drive clutch 54 is caused to couple. The power output delivered from the crankshaft 26 of the engine to the input shaft 34 through the torque converter assembly 14 is transmitted through the forward drive clutch 54 and the clutch hub 66 to the ring gear 90 of the first planetary gear assembly 84. The ring gear 90 is driven to rotate in the forward direction about the center axis of the output shaft 110 and thereby causes the sun gear 88 to rotate in the opposite direction about the center axis of the output shaft 110 through the planet pinions 92 each of which is rotated in the same direction as the ring gear 90 about its own axis of rotation. The sun gear 96 of the second planetary gear assembly 86, which is integral with the sun gear 88 of the first planetary gear assembly 84, is rotated in the opposite or reverse direction about the center axis of the output shaft 110 and causes the ring gear 98 of the second planetary gear assembly 86 to turn in the forward direction about the center axis of the output shaft 110. Under these conditions, the individual planet pinions 102 of the secnd planetary gear assembly 86 are caused to rotate in the forward direction about the respective axes of rotation thereof and therefore attempt to turn in the reverse direction about the center axis of the output shaft 110. The revolution of the pinion carrier 104 of the second planetary gear assembly 86 is, however, prohibited by the one-way clutch 130 connected to the pinion carrier 104, more specifically to the step portion 108 of the drum portion 106 with the result that the pinion carrier 104 is locked to the gear unit housing 48 and acts as reaction elements for the ring gear 98 which drives via the disc-shaped connecting member 112 the output shaft 110 to rotate in the forward direction about the center axis thereof. The output shaft 110 is connected to the pinion carrier 94 of the first planetary gear assembly 84 so that each of the planet pinions 92 is rotated about the center axis of the output shaft 110 in the same direction as the direction of rotation of the ring gear 90 of the first planetary gear assembly 84 but at a revolution speed which is lower with a certain ratio than the revolution speed of the ring gear 90 on which the planet pinions 92 are rolling, thereby creating the first forward speed or "low" gear ratio ($D_1$) in the transmission mechanism.

If the vehicle is thereafter sped up and the vehicle speed reaches a certain level, the band servo unit for the brake band 138 is actuated by a fluid distributed into the brake-apply fluid chamber of the servo unit and causes the brake band 138 to be tightened on the first clutch drum assembly 62 which is connected via the connecting shell 100 to the integral first and second sun gears 88 and 96 for the first and second planetary gear assemblies 84 and 86. The sun gear 88 of the first planetary gear assembly 84 now acts as a reaction element for the planet pinions 92 which are being driven to turn in the forward direction about the center axis of the output shaft 110 by the ring gear 90 rotating with the input shaft 34 through the forward drive clutch 54 which is kept coupled. The driving torque carried over to the ring gear 90 of the first planetary gear assembly 84 through the forward drive clutch 54 is therefore transmitted to the output shaft 110 by means of the planet pinions 92 and the associated pinion carrier 94. Under these conditions, the individual planet pinions 92 of the first planetary gear assembly 84 are caused to rotate in the forward direction about the respective axis of rotation thereof and thus roll on the ring gear 90 while rotating in the forward direction about the center axis of the output shaft 110. The output shaft 110 is thus rotated in the forward direction about the center axis thereof at a speed higher than that achieved under the first forward speed or "low" gear ratio ($D_1$) but lower with a certain ratio than the revolution speed of the ring gear 90 of the first planetary gear assembly 84, thereby producing the second forward speed or intermediate ratio ($D_2$) in the transmission mechanism. Under the second forward speed thus established, the output shaft 110 drives the ring gear 98 of the second planetary gear assembly 86 to rotate in the forward direction about the center axis of the output shaft 110 and thereby causes the planet pinions 102 to turn about the center axis of the output shaft 110 in the same direction as the direction of rotation of the ring gear 98. Thus, the pinion carrier 104 of the second planetary gear assembly 86 and accordingly the drum portion 106 are also rotated in the forward direction about the center axis of the output shaft 110 and cause the inner race member 134 of the transmission one-way clutch 103 to run idle within the outer race member 132 of the one-way clutch 130.

As the vehicle speed further increases, a fluid is distributed into the brake-release fluid chamber of the band servo unit for the brake band 138 and causes the brake band 138 to be released from the first clutch drum assembly 62 and, substantially at the same time, the high-and-reverse clutch 52 is actuated to couple. The power output delivered from the crankshaft 26 of the engine to the input shaft 34 is now transmitted on one hand to the integral first and second sun gears 88 and 96 of the first and second planetary gear assemblies 84 and 86 through the high-and-reverse clutch 52 and the first clutch drum assembly 62 released from the brake band 138 and on the other hand to the ring gear 90 of the first planetary gear assembly 84 by way of the forward drive clutch 54 and the clutch hub 66. It therefore follows that the sun gear 88 and the ring gear 90 for the first planetary gear assembly 84 are locked up so that the sun and ring gears 88 and 90 and the planet pinions 92 therebetween as well as the output shaft 110 connected to the planet pinion 92 by the pinion carrier 94 are driven to rotate as a single unit in the forward direction about the center axis of the output shaft 110. The output shaft 110 is thus rotated in the forward direction about the center axis thereof at a speed substantially equal to the revolution speed of the input shaft 34, thereby providing the third forward speed or "high" gear ratio ($D_3$) in the transmission mechanism. Under the third forward drive speed thus established, the input shaft 34 driven by the turbine runner 18 of the torque converter 14 is rotated at a speed substantially equal to the revolution speed of the engine crankshaft 26 driving the pump impeller 16 of the converter 14 and, as a consequence, there occurs no torque multiplication by the torque converter 14, which thus functions merely as a fluid coupling.

When the manual selector lever is moved into the reverse drive range "R". The high-and-reverse clutch 52 and the low-and-reverse brake 114 are actuated in the transmission mechanism. With the high-and-reverse clutch 52 thus engaged, the power output delivered from the crankshaft 26 of the engine to the input shaft 34 by way of the torque converter 14 is transmitted through the high-and-reverse clutch 52, first clutch drum assembly 62 and connecting shell 100 to the integral sun gears 88 and 96 of the first and second planetary gear assemblies 84 and 86, respectively, causing the sun gears 88 and 96 to rotate in the forward direction about the center axis of the output shaft 110. The low-and-reverse brake 114 is being actuated to lock the drum portion 106 and thus the pinion carrier 104 for the second planetary gear assembly 86 is held stationary with respect to the gear unit housing 48, with the result that the planet pinions 102 of the second planetary gear assembly 86 are driven by the sun gear 96 for rotation in the reverse direction about the center axis of the output shaft 110. This causes the output shaft 110 to rotate in the reverse direction about the center axis thereof at a speed which is lower with a certain ratio than the revolution speed of the sun gears 88 and 96 of the first and second planetary gear assemblies 84 and 86 and accordingly of the input shaft 34, establishing the reverse drive range "R" in the transmission mechanism.

When the selector lever is in the manual second forward drive range "2", the forward drive clutch 54 and the brake band 138 are actuated and, as a consequence the output shaft 110 is driven to rotate in the forward direction about the center axis thereof by means of the pinion carrier 94 of the first planetary gear assembly 84 as in the second forward speed ($D_2$) produced with the selector lever held in the automatic forward drive range "D".

Under the condition in which the selector lever is held in the manual first forward drive range position "1", either the low-and-reverse brake 114 or the brake band 138 as well as the forward drive clutch 54 is actuated to lock the pinion carrier 104 of the second planetary gear assembly 86 or the integral sun gears 88 and 96 of the first and second planetary gear assemblies 84 and 86 depending upon the vehicle speed. If the forward drive clutch 54 and the brake band 138 are actuated in this instance, the output shaft 110 is driven to rotate in the forward direction by the pinion carrier 94 of the first planetary gear assembly 84 as in the second forward speed ($D_2$) established with the selector lever held in the automatic forward drive range "D". If, on the other hand, the forward drive clutch 54 and the low-and-reverse brake 114 are actuated in the manual forward speed range, the output shaft 110 is driven to rotate in the forward direction about the center axis thereof by the ring gear 98 of the second planetary gear assembly 86 having the pinion carrier 104 held stationary with respect to the gear unit housing 48, as in the first forward speed ($D_1$) produced with the selector lever held in the automatic forward drive range "D". While the pinion carrier 104 is locked to the gear unit housing 48 by the action of the transmission one-way clutch 130 under the first forward speed produced in the automatic forward drive range, the pinion carrier 104 is locked to the gear unit housing 48 by means of the low-and-reverse brake 114 under the first forward speed produced in the manual first forward drive range. During the first forward speed in the manual first forward drive range, therefore a driving torque can be transmitted backwardly from the ring gear 98 to the sun gear 96 through the planet pinions 102 in the second planetary gear assembly 86 and, for this reason, the engine brake can be obtained.

The detailed construction of an arrangement for driving a governor valve body will be illustrated hereinafter with reference to FIGS. 3 to 7.

The ring gear 98 is generally cylindrical and composed of first and second cylindrical portions 98a and 98b which are defined by an imarginary plane indicated by a in FIG. 4, but the portions 98a and 98b are actually integral with each other as viewed in the figures. The first portion 98a is formed at the inner peripheral surface with gear teeth which are meshed with the teeth of the planetary pinions 102. The parking gear 144 is secured to the outer peripheral surface of the first portion 98a. The disc shaped connecting member 112 is secured to the inner peripheral surface of the second portion 98b of the ring gear 98. An example of the connecting member 112 is formed of a metal plate as shown in FIG. 4A, in which the member 112 is produced by press working such as drawing. Another example of the connecting member 112 includes a disc portion 112a and a cylindrical hub portion 112b as shown in FIG. 4B. In case of FIG. 4B, the disc portion 112a is secured at its outer periphery to the ring gear 98 and at its inner periphery to the hub portion 112b by technique of electron beam welding. The hub portion 112b is also securely mounted on outer peripheral surface of the output shaft 110.

The second portion 98b of the ring gear 98 is formed at its outer peripheral surface with worm wheel teeth 200 which mesh with the teeth of a worm 202. A governor shaft 204 is secured to the worm 202 and operatively connected to a governor valve body 206 to rotate the valve body 206 in accordance with the rotational speed of the output shaft 110. The governor valve body 206 is constructed and arranged to produce a governor pressure by modulating a line pressure in accordance with the rotation thereof. The governor pressure increases with the rotational speed of the output shaft 110 and therefore with vehicle speed. The valve body 206 is covered with a governor cap 208 which is detachably secured to a cup shaped portion 48a of the gear unit casing 48 by means of a snap ring 210.

As viewed in FIG. 7, the radius $R_1$ of the root circle of the ring gear 98 is designed smaller than that $R_2$ of the worm wheel teeth 200 and thereby the worm wheel teeth 200 are formed at the peripheral surface of the ring gear 98. With this arrangement, the dimension indicated by $W_2$ is considerably smaller than that $W_1$ of prior art shown in FIG. 2. Ths causes shortening of the inner construction of the transmission in the axial direction of the output shaft 110, and therefore results in providing a compact automatic transmission. Additionally, the connecting member 112 of this instance is formed of a metallic plate and accordingly can be easily made, for example, only by pressing the plate, as compared with the connecting member 4 of prior art shown in FIGS. 1 and 2. Because, the connecting member 4 of the prior art is complex in its construction and made, for example, by casting.

What is claimed is:

1. An automatic transmission including a torque converter, first and second planetary gear assemblies each of which has a set of planet pinions, a power input shaft drivably connecting the planetary gear assemblies to the torque converter, and a power output shaft which operatively connecting the planetary gear assemblies to a final drive unit through an output gear;

the improvement comprising:
a first flat annular disc connected at the inner periphery thereof to a driven shaft for synchronous rotation therewith;
a ring gear of said second planetary gear assembly having outer and inner surfaces bounded by first and second edge surfaces, said ring gear being fixed at said inner surface thereof to the outer periphery of said first disc at a location proximate the first edge surface of said ring gear, said ring gear having a first set of worm wheel teeth on said outer surface and a second set of teeth on said inner surface;
a second flat annular disc fixed at the inner periphery thereof to said outer surface of said ring gear proximate the second edge surface of said ring gear, said second disc being formed with teeth at the outer periphery thereof;
and
a worm having teeth which are meshed with the worm wheel teeth of said ring gear, said worm being operatively connected to a governor valve body which produces a governor fluid pressure which increases with the rotational speed of the power output shaft.

2. An automatic transmission as claimed in claim 1, in which said worm is so located that its axis is spaced apart from and perpendicular to the axis of said ring gear.

3. An automatic transmission as claimed in claim 1, wherein said second planetary gear assembly includes
a pinion carrier;
planet pinion gears carried on said pinion carrier, said planet pinion gears meshing with said second set of teeth; and
a one way clutch having an outer race attached to the casing of said transmission and an inner race carried on said pinion carrier, said one way clutch being elongate in the radical direction thereof and juxtaposed said second flat member and said ring gear in a spaced contact free relationship therewith.

4. In a vehicle transmission having a hydrokinetic unit, a planetary gear unit connected to said hydrokinetic unit through an input shaft and which includes first and second planetary gear assemblies each of which has a set of planet pinions, and a final drive unit connected to said planetary gear unit through an idler gear which meshes with an output gear carried on an output shaft of said planetary gear unit,
a first housing unit formed with integral first and second inversely oriented bell portions, said first and second bell portions each having a mouth and a head and respective longitudinal axes which are substantially parallel, said first bell portion receiving said hydrokinetic unit therein and said second bell portion receiving said final drive unit therein,
a secod housing unit formed with an integral third bell portion and cover member, said third bell portion receiving therein said planetary gear unit, said second housing unit being connectable to said first housing unit so that the mouth of said third bell portion encloses a part of the head of said first bell portion and contacts said first bell portion to define an interface which lies on a plane, so that the longitudinal axis of said third bell portion is substantially aligned with the longitudinal axis of said first bell portion and so that the cover member closes the mouth of said second bell portion;

a first single piece support member for supporting said hydrokinetic unit which is so constructed and arranged as to be detachably connected to the interior of said first bell portion to close off a portion thereof and thus define a chamber in the head of said first bell portion which is inboard of said hydrokinetic unit, said chamber housing said output gear, said first support member being formed with a through bore through which said input shaft is disposed;

a first bearing which is disposed in an annular recess defined about a first aperture formed in the head of said first bell portion and through which said input and output shafts extend, said annular recess being arranged so that said first bearing can be placed thereinto only through the mouth of said first bell portion;

a second bearing disposed in the mouth of said through bore which is exposed to said chamber; said first and second bearings supporting said output gear within said chamber so that the face of the output gear which faces the planetary gear unit lies on the planetary gear side of said plane;

A cylindrical support member which rotatably supports said idler gear and which is mounted at one end to said first bell portion and at the other end to said support member;

a governor valve for said planetary gear unit which has a shaft disposed through said third bell portion at a level inboard of said plane, said shaft having a worm at one end thereof;

a ring gear of one of said first and second planetary gear assemblies disposed in said third bell portion so as to be entirely inboard of said plane, said ring gear having worm wheel teeth on the external surface thereof which mesh with said worm and another set of teeth on the internal surface thereof;

a pinion carrier associated with said ring gear;

planet pinion gears carried on said pinion carrier which mesh with said another set of teeth; and a one way clutch having an outer race attached to said third bell portion and an inner race carried on said pinion carrier, said one way clutch being disposed inboard of and juxtaposed with said ring gear in a contact free relationship therewith.

5. A vehicle transmission as claimed in claim 4, wherein said ring gear has a substantially rectangular cross section.

6. A vehicle transmission as claimed in claim 5, wherein said ring gear includes
a first flat annular member which is fixed at the internal periphery thereof to said output shaft for synchronous rotation therewith and at the outer periphery thereof to said inner surface of said ring gear; and a second flat annular member which is fixed at the inner periphery thereof to said outer surface of said ring gear and which is formed with gear teeth at the outer periphery thereof.

7. In an automatic transmission including a torque converter, first and second planetary gear assemblies each of which has a set of planet pinions, a power input shaft drivably connecting the planetary gear assemblies to the torque converter, and a power output shaft which operatively connects the planetary gear assemblies to a final drive unit through an output gear;

a ring gear of one of said first and second planetary gear assemblies which has a substantially rectangular cross section and which is formed with worm wheel teeth on the external surface thereof and another set of teeth on the inner surface thereof;

a first flat annular member fixed at the inner periphery thereof to said output shaft for synchronous rotation therewith and fixed at the outr periphery thereof to the inner surface of said ring gear;

a second flat annular member fixed at the inner periphery thereof to the external surface of said ring gear and formed at the outer periphery thereof with gear teeth;

a pinion carrier associated with said ring gear;

planetary pinion gears carried on said pinion carrier which mesh with said other set of teeth;

a one way clutch having inner and outer races, said inner race being fixed to said pinion carrier for synchronous rotation therewith, said one way clutch being disposed adjacent said ring gear and second flat annular member in a spaced contact free relationship therewith; and a worm having teeth which mesh with said worm wheel teeth of said ring gear, said worm being operatively connected to a governor valve body which produces a governor fluid pressure which increases with the rotational speed of said power output shaft.

* * * * *